United States Patent [19]
Hopwood

[11] Patent Number: 4,987,479
[45] Date of Patent: Jan. 22, 1991

[54] METHOD OF PREPARING A COLOR HOLOGRAM SUITABLE FOR DISPLAY PURPOSES

[75] Inventor: Anthony I. Hopwood, Macclesfield, England

[73] Assignee: Ilford Limited, Cheshire, England

[21] Appl. No.: 328,004

[22] Filed: Mar. 23, 1989

[30] Foreign Application Priority Data

Mar. 24, 1988 [GB] United Kingdom ................. 8807029

[51] Int. Cl.⁵ ............................................ H04N 15/00
[52] U.S. Cl. ......................................... 358/3; 358/90; 350/3.83
[58] Field of Search ...................... 358/2, 90; 350/3.6, 350/3.61, 3.66–3.71, 3.83

[56] References Cited

U.S. PATENT DOCUMENTS

| | | |
|---|---|---|
| T861,026 | 4/1969 | Harper et al. |
| 3,566,021 | 2/1971 | Jakes, Jr. ................................. 358/90 |
| 3,600,056 | 8/1971 | King, Jr. |
| 3,625,584 | 12/1971 | St. John |
| 3,647,289 | 3/1972 | Weber |
| 3,695,744 | 10/1972 | Clay ..................................... 358/2 X |
| 3,826,555 | 7/1974 | Matsumoto |
| 3,860,950 | 1/1975 | Wick et al. ............................... 358/2 |
| 4,007,481 | 2/1977 | St. John |
| 4,142,204 | 2/1979 | Hannan |
| 4,235,505 | 11/1980 | Hariharan et al. |
| 4,375,649 | 3/1983 | Mir et al. |
| 4,378,142 | 3/1983 | Ono |
| 4,378,568 | 3/1983 | Mir |
| 4,442,455 | 4/1984 | Huignard et al. ................. 358/90 X |
| 4,610,499 | 9/1986 | Chern et al. |
| 4,623,214 | 11/1986 | Bazargan |
| 4,623,215 | 11/1986 | Bazargan |
| 4,712,852 | 12/1987 | Funato et al. |
| 4,758,093 | 7/1988 | Stern et al. |
| 4,895,419 | 1/1990 | Doyle et al. |

FOREIGN PATENT DOCUMENTS

| | | |
|---|---|---|
| 0036298 | 9/1981 | European Pat. Off. |
| 0087281 | 8/1983 | European Pat. Off. |
| 0106607 | 4/1984 | European Pat. Off. |
| 0128033 | 12/1984 | European Pat. Off. |
| 0245198 | 11/1987 | European Pat. Off. |
| 1924585 | 11/1970 | Fed. Rep. of Germany |
| 58-115469 | 4/1983 | Japan |
| 1278672 | 6/1972 | United Kingdom |
| 1316677 | 5/1973 | United Kingdom |
| 2159979 | 12/1985 | United Kingdom |

OTHER PUBLICATIONS

C. J. Kramer, "Holographic Laser Scanners for Nonimpact Printing", 2394 *Laser Focus*, vol. 17 (1981), Jun., No. 6.

(List continued on next page.)

*Primary Examiner*—Victor A. Kostak
*Attorney, Agent, or Firm*—Burns, Doane, Swecker & Mathis

[57] ABSTRACT

A method of preparing a hologram of an object on holographic material by a holographic laser exposure, by illuminating the object with white light and capturing the luminance values of the object using a detector having a filter which simulates the response of the human eye to luminance values and which detector is placed as if it were along the axis of the laser to be used for the holographic exposure and storing the luminance information as a positive image, illuminating the object with incident light of substantially the same wavelength as the laser light to be used for the holographic exposure and capturing the reflectance values from the object using a detector which is placed as if it were along the axis of the laser to be used for the holographic exposure and storing the reflectance information as a negative image, carrying out a holographic exposure of the object on to holographic material there being present in the object beam between the laser and the object light modulation means which represents the sum of the stored luminance and reflectance information and processing the holographic material to fix the holographic fringes therein. Preferably the white light employed is specular white light.

The resultant hologram when reconstructed exhibits a similar reflectance and tonal range pattern to that of the object when viewed in a white light by the human eye.

14 Claims, 4 Drawing Sheets

OTHER PUBLICATIONS

H. P. Herzig et al., "Holographic Optical Scanning Elements: Analytical Method for Determining the Phase Function", 736A *J. Opt. Soc. Am. A/Optics & Image Science* 4, No. 6 (1987), Jun.

A. W. Pressdee, "Holografische Kopien sind Falschungssicher", 2253 *Laser und Optoelektronik*, 18 (1986), Mar., No. 1.

Y. Belvaux, "Duplication des Hologrammes", *Annales De Radioelectricite*, T. XXII., No. 88, 22 Apr. 1967.

"Preparation of Reflection Holograms by Interference Copying of Transmission Holograms", V. A. Vanin, 2287 Soviet J of Quantum Electronics, vol. 8, No. 7 (1978.07), New York.

European Search Report, RS 81117 CH.

European Search Report, RS 81286 CH.

European Search Report, RS 81287 CH.

Patent Abstract of Japan, vol. 8, No. 31, Feb. 9, 1984.

Patent Abstract of Japan, vol. 10, No. 19, Jan. 24, 1986.

Patent Abstract of Japan, vol. 7, No. 224, Oct. 5, 1983.

Patent Abstract of Japan, vol. 3, No. 38, Mar. 30, 1979 believed to relate to Japanese Patent 54-17865.

METHOD OF PREPARING A COLOR HOLOGRAM SUITABLE FOR DISPLAY PURPOSES

BACKGROUND OF THE INVENTION

This invention relates to the production of holograms and in particular to the production of holograms for display purposes Display holograms often suffer from two major defects when reconstructed. The first defect is the appearance of highlights which emphasize areas or points on the holographic image of the object in a way which distorts the representation or renders it difficult to view the image in its entirety. The other defect could be called a subject failure. For example if the object were a box having green and blue sides, when viewed normally in white light the difference between the two colors and thus the sides of the box are readily apparent. However if a hologram of the box was made using a He:Ne laser the sides of the box whether blue of green may appear to reflect light equally. Thus when the hologram of the box is reconstructed the sides of the box cannot be distinguished from each other. In an extreme case if a hologram were taken of a group which comprised a figure of a white person and a figure of a black person both figures on reconstruction could appear to have almost identical skin tones because of their reflectivity at the wavelength of the laser used in the preparation of the hologram.

In the past efforts have been made to alleviate this problem by effecting alterations in the object itself. For example by painting the object to alter its colour or reflectivity.

Certain background prior art with regard to the laser exposure of objects to prepare a hologram therefrom is known to us. This includes two Patent Abstracts of Japan references, viz Volume 8 No. 31 (P-258) ]1468] Feb. 9, 1984 relating to JP-A-58184985 and Volume 3 No 38 (E-101) Mar. 30, 1979, relating to JA-A-54 17865. European patent application No. 128033 and British Patent Specification No. 1316677.

SUMMARY OF THE INVENTION

It is the object of the present invention to provide a hologram of an object which when reconstructed exhibits a similar reflectance and tonal range pattern to that of the object when viewed in white light by the human eye. This is accomplished by modulating the object beam during the holographic exposure.

Therefore according to the present invention there is provided a method of preparing a hologram of an object on holographic material by a holographic laser exposure which comprises the steps of (a) illuminating the object with white light and capturing the luminance values of the object using a detector having a filter which simulates the response of the human eye to luminance values and which detector is placed as if it were along the axis of the laser to be used for the holographic exposure and storing the luminance information as a positive image, (b) illuminating the object with incident light of substantially the same wavelength as the laser light to be used for the holographic exposure and capturing the reflectance values from the object using a detector which is placed as if it were along the axis of the laser to be used for the holographic exposure and storing the reflectance information as a negative image, (c) carrying out a holographic exposure of the object onto holographic material there being present in the object beam between the laser and the object light modulation means which represents the sum of the stored luminance and reflectance information and (d) processing the holographic material to fix the holographic fringe therein. Preferably the white light employed is specular white light.

The detector used both during the luminance illumination and during the reflectance illumination may be placed where the laser is to be placed during the holographic exposure or it may be reflected on to the object using a mirror in such a way that it appears to have come from where the laser is to be situated.

When the object is illuminated with incident light of substantially the same wavelength as the laser to be employed in the holographic exposure the laser may be used or white light may be used together with a narrow pass band filter which filters out all light except that which is substantially the same wavelength as the laser to be used.

It is to be understood that the reflectance values may be captured before the luminance values and vice versa.

There are two main ways of capturing the luminance or reflectance values and storing them. One method involves the use of a photographic camera as the detector device and photographic film material as the storage device.

Therefore in one method of the present invention there is provided a method of preparing a hologram of an object on holographic material by a holographic laser exposure which comprises illuminating the object with white light and taking a photograph of the object when so illuminated the camera being placed as if it were on the axis of the laser to be used for the holographic exposure having a filter which reduces in part at least the blue light incident on the camera and the photograph being taken on a film which is processed to yield a positive transparency of the object, illuminating the object with incident light of substantially the same wavelength as the laser light to be used for the holographic exposure and taking a photograph of the object when so illuminated using a camera which is placed as if it were on the axis of the laser to be used for the holographic exposure, the photograph being taken on film which is processed to yield a negative image of the object carrying out a holographic exposure of the object on to holographic material there being present in the object beam between the laser and the object a filter which comprises the said positive transparency in register with the said negative image of the object, and processing the holographic material to fix the holographic fringes therein.

Preferably the white light is a specular white light. Black and white or color film can be used in the camera. Various color filters are available which are designed to match the human eye's luminance response when used with black and white film. For example the Ilford filter 402 which is a yellow/green filter. Other filters are available for use with other color film.

Thus the combination of the filter used for the exposure and the film's characteristic curve would be so chosen that the resultant positive transparency would modulate the illumination of the object during the holographic exposure so as to reproduce better the luminance values in the reconstructed hologram.

With regard to the negative image the negative is least dense where the object is least reflective so that when the object is exposed through the negative the least reflective areas will receive most light.

Thus with optimum exposure and processing a negative can be produced which when inserted in to the object beam will cause the object to appear to be more uniformly reflective.

Preferably both the positive transparency and the negative transparency are exposed to provide unsharp images thus providing unsharp masks which facilitates the registration of the modulated laser beam with the object. These unsharp masks enhance the apparent detail of the image when it is replayed in the resultant hologram.

In the other way of capturing the luminance and reflectance values and storing them a video camera is used as the detector device and a pixel array of light valves as the storage device.

Therefore according to this method of the present invention there is provided a method of preparing a hologram of an object on holographic material by a holographic laser exposure which comprises illuminating the object with white light and preparing video signals representative of that image by use of a video camera placed as if it were on the axis of the laser to be used for the holographic exposure, the video camera being associated with a filter which simulates the response of the human eye to luminance values, digitizing the video signals and storing them in a matrix passing this information to a pixel array of light valves as a positive image of the signals, illuminating the object with incident light of substantially the same wavelength as the laser to be used for the holographic exposure and preparing a video signal representative of that image by use of a video camera placed as if it were on the axis of the laser to be used for the holographic exposure, digitizing the video signals and storing them in a matrix, passing this information to a pixel array of light valves as a negative image of the signals, carrying out a holographic exposure of the object on to holographic material, there being present in the object beam between the laser and the object either the array of light valves which carries a positive image of the luminance values and the array of light valves which carries the said negative image or an array of light valves which carries an image which is a summation of both the said negative and positive images, the sum of the densities in the array of light valves or devices being sufficiently low to allow most of the laser light to pass but being sufficiently dense to modulate the laser beam, and processing the holographic material to fix the holographic fringes therein.

Preferably the white light used is specular white light. Preferably both sets of information derived from the video signals are stored in the same array of light valves.

In a manner similar to the use of the photographic transparencies the information stored as the positive image in the array of light valves modulates the illumination of the object during the laser exposure so as to reproduce better the luminance of the reconstructed hologram and the information stored as the negative image in the array of light valves modulates the illumination of the object during the laser exposure so as to cause the object to be uniformly reflective.

Preferably there is provided a monitor coupled to the signal digitizing means and means are provided for altering the stored image in the matrix and communicating this alteration to the matrix array of light valves. The monitor is of particular use when the white light employed is not specular.

There appears on the monitor a view of the illuminated object after the illuminating light has been modulated by the array of light valves. Thus an alteration in real time can be made until a satisfactory image appears on the monitor indicating that the desired corrections have been made to the image in the array of light valves to enable it to modulate the laser beam either to correct the reflectance or the luminance values of the illuminated object.

Preferably the means for altering the stored image includes a means for selectively controlling each element of the matrix array of the digitized image and includes means for transmitting the modified image to the matrix array of light valves. Thus the elements of the light valve array are turned on or off corresponding to the digitized image to produce a density mask having localized correction areas.

By an array of light valves is meant an array of pixels which are directly addressable and are activatable from a light block to a light transmitting condition by selective application of an electric field.

A particularly useful light valve array is a liquid crystal display device (L.C.D.). Light valves made from other materials such as described in U.S. Pat. No. 4,375,649 and U.S. Pat. No. 4,378,568. These materials are electro-optic material transformable by an electric field from a non-polar, isotropic state to a polar birefringent state.

Preferably the optical density of each pixel in the L.C.D. can be altered to give a range of optical densities.

The holographic material used may be a gelatino silver halide emulsion, dichromated gelatin or a photopolymer sensitized system.

A suitable photopolymerization mixture comprises in the hydrophilic water-swellable binder an ethylenically unsaturated monomer, a dye capable of initiating free radical polymerization on exposure to light in the presence of an initiator and an initiator.

The suitable ethylenically unsaturated monomers for use in the present invention are the metal salts of acrylic or methacrylic acids. The preferred salts are lithium, sodium, potassium, barium, lead, zinc or magnesium acrylate. The most preferred salts are lithium or zinc acrylate.

Mixture of the metal acrylates may be used or mixtures of metal acrylate and another ethylencially unsaturated monomer such as acrylamide, methacrylamide, N-hydroxymethylacrylamide, methylene bisacrylamide. Also esters of acrylic and methacrylic acids having low volatility may also be used, for example pentacrythritol tetraacylate, trimethylolpropane trimethacrylate and polybutanediol diacrylate.

Suitable dyes for initiating free radical polymerization include riboflavin, Rose Bengal, erythosin and eosin.

Suitable polymerization initiating compounds include methanolamine and ketones such as benzophenone, peroxides such as benzoyl peroxide, sulphur compounds such as diphenyl sulphide and azo compounds such as azoxystyrene.

When the holographic material from which the hologram is prepared is silver halide sensitized preferably the silver halide is predominantly silver bromide having a crystal size range of from 5 nm to 50 nm.

The supporting base may be any transparent base used in the photographic industry for example glass, biaxially oriented polyethylene terephthalate or polycarbonate or a cellulose derivative such as cellulose triacetate.

The photosensitive layer may have been coated on the base by any of the conventional techniques well known to the photographic industry such as by use of a doctor bar, or by slot, cascade curtain or dip methods. The coated layer may then be dried by normal hot air methods. When the material is a dichromated gelatin hologram the coated gelatin layer is sensitized with a dichromate solution just before it is holographic exposed.

The holographic exposure method used to produce the hologram may be any of the well known methods used to produce either a transmission or preferably reflection hologram using a laser source. Any suitable laser source can be used but of particular utility to produce display holograms are He:Ne lasers, pulsed ruby lasers and argon-ion lasers.

BRIEF DESCRIPTION OF THE DRAWINGS

Other objects and advantages of the present invention will become apparent from the following detailed description of preferred embodiments as described in conjunction with the accompanying drawings in which.

DETAILED DESCRIPTION OF PREFERRED EMBODIMENTS

Figure 1:
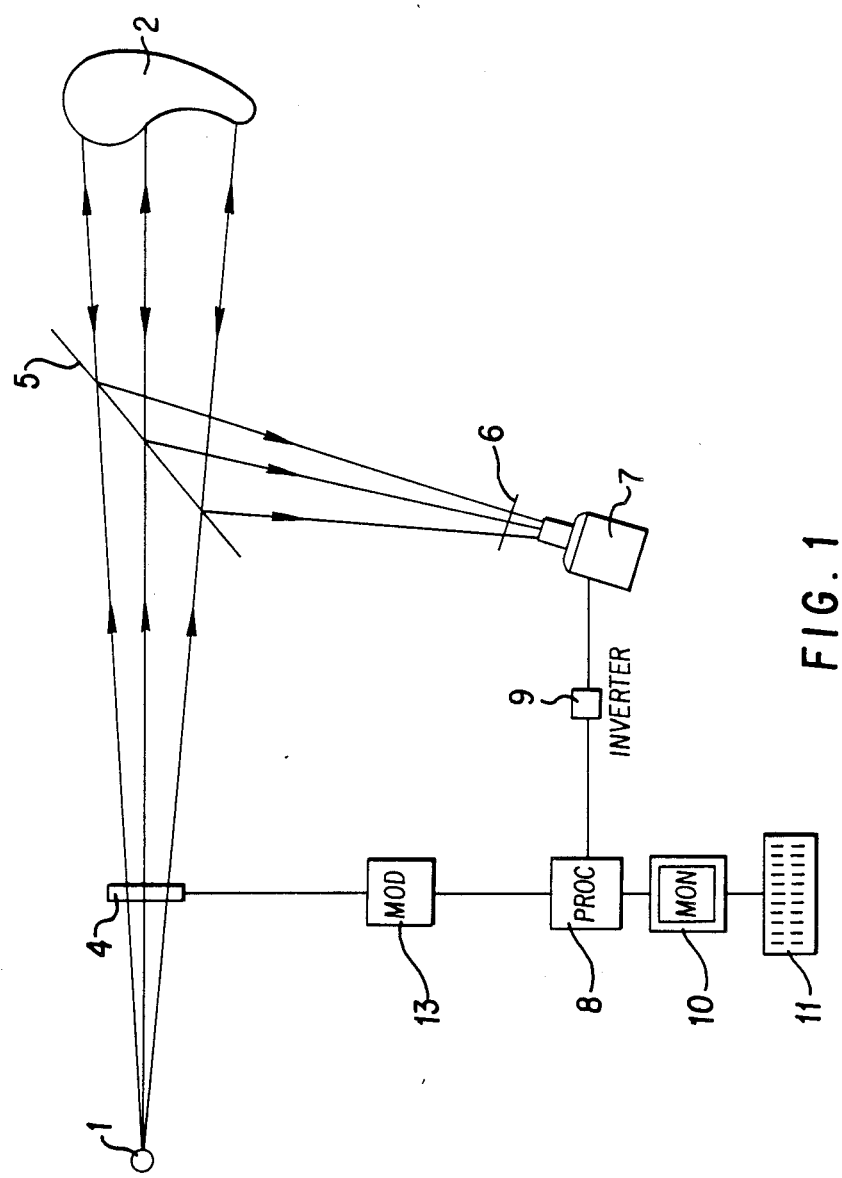
FIGS. 1 and 2 relate to the set-up employed when using a video camera and an L.C.D.

In FIG. 1 light from a white light source 1 specularly illuminates an object 2. The light from the source 1 passes through an L.C.D. device 4 which initially is completely light transparent and passes through a beam splitter 5. Light from the object 2 is reflected back to the beam splitter 5 and some of it is passed to the video camera 7 via a filter 6.

Connected to the video camera 7 is a processor 8 that is programmed to digitize the image and store it in a matrix. Connected between the processor 8 and the camera 7 is an image inverter 9. Connected with the processor 8 is a video monitor 10. Connected to monitor 10 is a manual keyboard 11.

Also connected to the processor 8 is an R.F. modulator 13 which is connected to L.C.D screen 4.

In the first illumination white light source 1 is activated and the white light reflected from the object 2 is picked up by the video camera 7 through filter 6 which is a broad band filter which simulates the human eye's response to the reflected tonal values. The video signals from the video camera 7 are passed to the processor 8 which digitizes them and stores them in a memory in a matrix array.

This image can be viewed on the monitor 10. If needs be this image can be altered on a pixel-by-pixel basis by inputting through the keyboard 11. The altered image can then be viewed on the monitor 10. The image from the processor is then relayed to the L.C.D. 4 through the R.F. modulator 13 to obtain the correct video format. The image from the processor 8 controls the L.C.D. 4 to turn individual pixels on or off or to a desired transmission level to allow transmission or blockage of light in accordance with the image viewed by the monitor. This system is essentially a system having a feed-back display of the modulation which will be achieved by use of the L.C.D. as a light filter in correcting the tonal values of the light reflected by the object as would be observed by the human eye.

This image array in the pixels of the L.C.D is then stored in the processor 8 and the L.C.D. cleared. During this illumination the image inverter 9 is not employed.

In the second illumination white light source 1 is activated and the white light reflected by the object 2 is picked up by the video camera 7 via an interference filter 6 at the laser wavelength.

As before the video signals from the camera 7 are passed to the processor 8 via the image inverter 9 and stored then in a memory in a matrix array as what is in effect a negative image. The image in the processor is then caused to control the L.C.D. 4 to allow as before transmission or blockage of light. This image can then be viewed on the monitor 10 to see if there is now equal light reflectance from all parts of the object.

If there is not the image can be altered by use of the key-board 11 which alters the light transmission of the pixels in the L.C.D. The processor then integrates the two stored images to produce a single image which can then be fed to the L.C.D.

Figure 2:
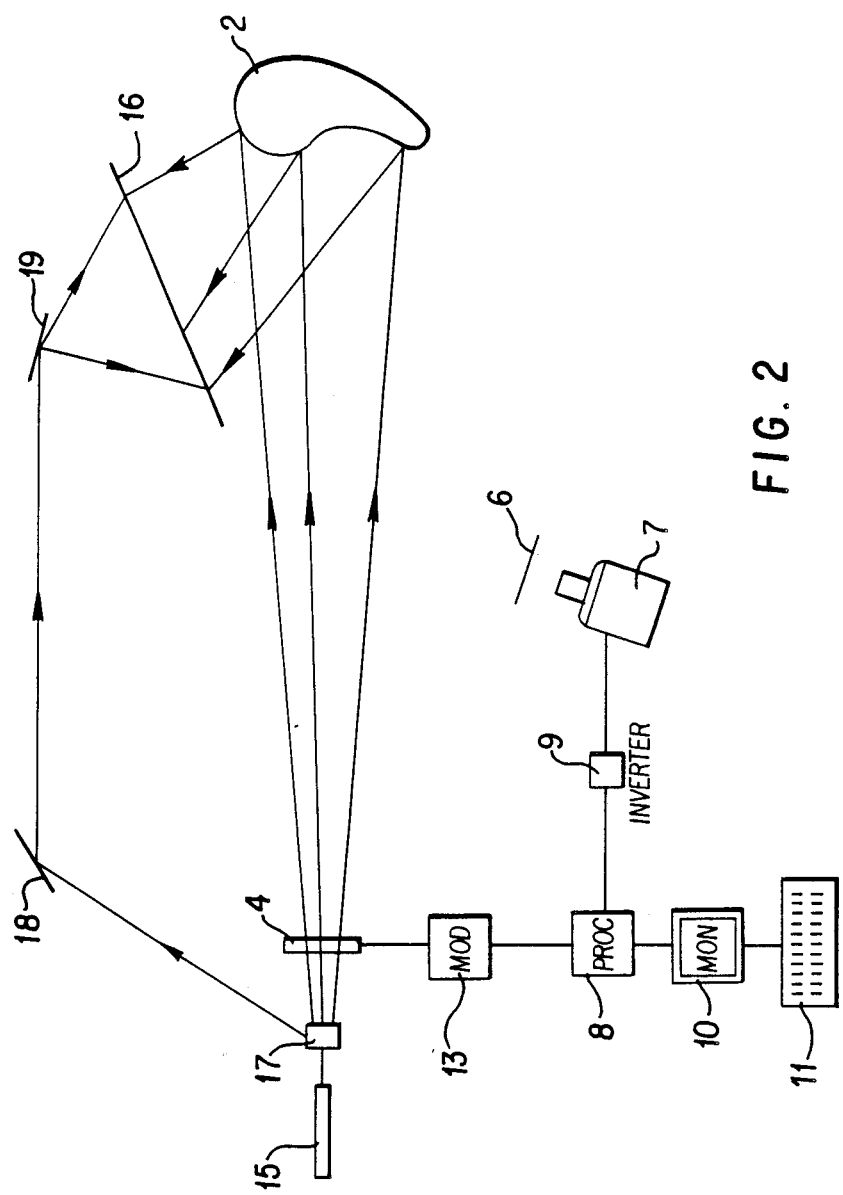

In FIG. 2 the same numbers have the same signification. The elements 7,9,10 and 11 are shown in the same position as in FIG. 1 but they are not used in this part of the method.

In FIG. 2 a laser light source 15 has replaced the white light source 2 and the beam splitter 5 has been removed. Light from the laser 15 is split by a beam splitter 17 and some passes via the L.C.D. 4 to the object 2 as the object beam.

The remainder is directed by mirrors 18 and 19 to pass into the supported sheet of holographic film material 16 as the reference beam.

Before the laser light is activated the integrated stored image in the processor 8 is passed to the L.C D. 4 to form a pattern of light and dark pixels therein.

In the set-up in FIG. 2 the holographic material 16 is exposed to produce a reflection hologram. The object beam from the laser 15 passes to the object 2. This light is reflected back to the holographic material 16 where it interferes with the reference beam to form the holographic fringes in the holographic material. The holographic material can then be processed to fix the holographic fringes therein.

When a hologram made by this method was displayed in white light there were no unpleasant highlights and the various parts of the object which were of different color were clearly discernible from each other as having different tonal values.

Figure 3:
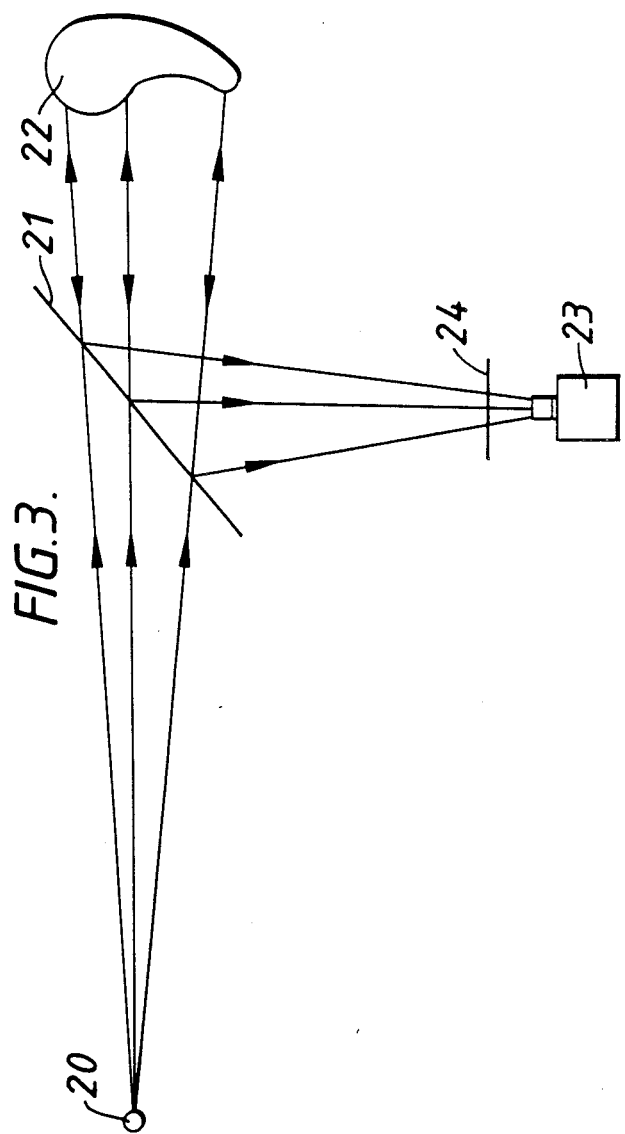
FIGS. 3 and 4 relate to the set-up employed when using a photographic camera and photographic transparencies as the laser light modulator.
Figure 4:
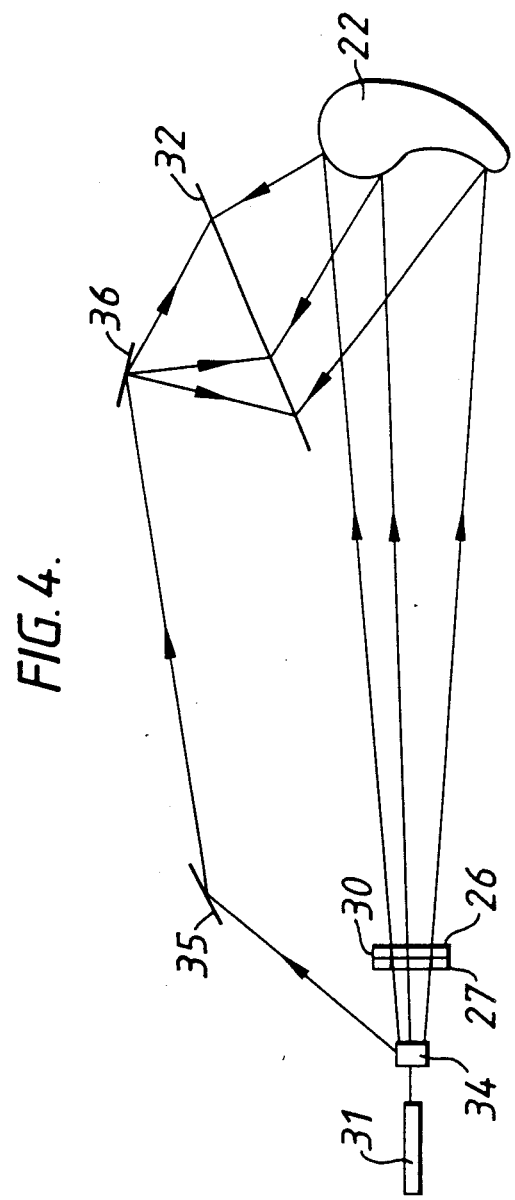

FIGS. 3 and 4 illustrate the method wherein photographic transparencies are used to modulate the object beam from the laser.

In FIG. 3 in a first camera exposure light from a white light source 20 passes via a beam splitter 21 to an object 22.

Some of the light from the object is reflected via the beam splitter 21 to a photographic camera 23 via a yellow/green filter 24. In the camera this light exposes a black and white film.

This film is removed from the camera and is processed to yield an unsharp light-in-density black and white positive transparency 26.

In a second exposure the filter 24 is replaced by a narrow pass-band intereference filter which allows only light of substantially the same wavelength as the laser to be used to pass.

A similar exposure is carried out but in this case the black and white film is processed to form an unsharp light-in-density black and white negative 27.

The transparency 26 and the negative 27 are then laminated in register to form a light modulating filter 30.

In FIG. 4 a laser 31 has replaced the white light source 20. The object is in exactly the same place as in FIG. 3. The laser light strikes the object 22 and some of it is reflected into the sheet of holographic material 32.

A reference beam is formed by splitting off some of the laser light by use of a beam splitter 34 and this beam is guided via mirrors 35 and 36 to enter the holographic material from the reverse side.

The laser 31 is then activated and the object beam passes through the filter 30 where it is modulated and some of the modulated light falls on the object 22 and is reflected back into the holographic material 32 where it interferes with the light from the reference beam to form the holographic fringes. The holographic material is then processed to fix the holographic fringes.

A display hologram made by this method and when reconstructed by white light displayed no unpleasant high lights and all the tonal ranges of the object were displayed so as to be clearly discernible and in agreement with the subjective appearance of the object in white light.

The method of FIGS. 1 and 2 allows a light modulating filter to be made in real-time but the equipment required is expensive. The method of FIGS. 3 and 4 uses only a camera and filters in addition to the usual equipment used for holographic exposures. However two photographic processes are required to yield a combined filter.

Furthermore several camera exposures may be required to obtain either a suitable negative or a positive transparency.

In the figures a reflection hologram was produced. However in practice a transmission master hologram is most likely to be prepared from which reflection copies can be prepared.

It will be appreciated by those or ordinary skill in the art that the present invention can be embodied in other specific forms without departing from the spirit of essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method of preparing a hologram of an object on holographic material by a holographic laser exposure which comprises
   (a) illuminating the object with white light and capturing the luminance values of the object using a means for detecting having a filter which simulates the response of the human eye to luminance values and which detector means is placed as if it were along the axis of the laser to be used for the holographic exposure and storing the luminance information as a positive image,
   (b) illuminating the object with incident light of substantially the same wavelength as the laser light to be used for the holographic exposure and capturing the reflectance values from the object using a said means for detecting which is placed as if it were along the axis of the laser to be used for the holographic exposure and storing the reflectance information as a 'negative' image,
   (c) carrying out a holographic exposure of the object on to holographic material there being present in the object beam between the laser and the object light modulation means which represents the sum of the stored luminance and reflectance information and
   (d) processing the holographic material to fix the holographic fringes therein.

2. A method according to claim 1 wherein the white light used is specular.

3. A method of preparing a hologram of an object on holographic material which comprises
   (a) illuminating the object with white light and taking a photograph of the object when so illuminated with means for photographing being placed as if it were on the axis of a laser to be used for the holographic exposure and having a filter which reduces in part at least the blue light incident on the photographing means and the photograph being taken on a film which is processed to yield a positive transparency of the object,
   (b) illuminating the object with incident light of substantially the same wavelength as the laser light to be used for the holographic exposure and taking a photograph of the object when so illuminating using said means for photographing which is placed as if it were on the axis of the laser to be used for the holographic exposure, the photograph being taken on film which is processed to yield a negative image of the object,
   (c) carrying out a holographic exposure of the object on to holographic material there being present in the object beam between the laser and the object a filter which comprises the said positive transparency in register with the said negative image of the object, and
   (d) processing the holographic material to fix the holographic fringes therein.

4. A method according to claim 3 wherein the films used are black and white films.

5. A method according to claim 3 wherein the films used are color films.

6. A method according to claim 3 wherein both the positive transparency and the negative image are exposed to provide unsharp images.

7. A method according to claim 3, wherein the white light used is specular.

8. A method of preparing a hologram of an object on holographic material which comprises
   (a) illuminating the object with white light and preparing video signals representative of that image by use of a video camera placed as if it were on the axis of a laser to be used for the holographic exposure, the video camera being associated with a filter which simulates the exposure of the human eye to luminance values, digitizing the video signals and storing them in a matrix, passing this information to a pixel array of light valves as a positive image of the signals, (b) illuminating the object with incident light of substantially the same wavelength as the laser to be used for the holographic exposure and preparing a video signal representative of that image by use of said video camera placed as if it were on the axis of the laser to be used for the holographic exposure, digitizing the video signals and storing them in a matrix, passing this information to a pixel array of light valves as a negative image of the signals, (c) carrying out a holographic exposure of the object on to holographic material, there being present in the object beam between the laser and the object either the array of light valves which carries a positive image of the luminance values and the array of light valves which carries the said negative image or an array of light valves which carries an image which is a summation of both the said negative and positive images, and (d) processing the holographic material to fix the holographic fringes therein.

9. A method according to claim 8 wherein both sets of information derived from the video signals are stored in the same array of light valves.

10. A method according to claim 9 wherein a monitor is coupled to the signal digitizing means and means are provided for altering the stored image in the matrix and for communicating this alteration to the matrix array of light valves.

11. A method according to claim 10 wherein the means for altering the stored image includes a means for selectively controlling each element of the matrix array of the digitized image and includes means for transmitting the altered image to the matrix array of light valves.

12. A method according to claim 9 wherein the light valve array is a liquid crystal display (L.C.D.) device.

13. A method according to claim 12 wherein the optical density of each pixel in the L.C.D. can be altered to give a range of optical densities.

14. A method according to claim 8, wherein the white light used is specular.

* * * * *